US012772187B2

(12) United States Patent
Abotabl et al.

(10) Patent No.: US 12,772,187 B2
(45) Date of Patent: Oct. 20, 2026

(54) TECHNIQUES FOR ADAPTING TRANSMISSION OF WIRELESS COMMUNICATIONS BASED ON SYNCHRONIZATION SIGNAL BLOCK (SSB) INDICATION

(71) Applicant: QUALCOMM Incorporated, San Diego, CA (US)

(72) Inventors: Ahmed Attia Abotabl, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/587,419

(22) Filed: Feb. 26, 2024

(65) Prior Publication Data

US 2025/0274886 A1 Aug. 28, 2025

(51) Int. Cl.

| | |
|---|---|
| ***H04W 56/00*** | (2009.01) |
| ***H04W 72/1268*** | (2023.01) |
| ***H04W 72/21*** | (2023.01) |

(52) U.S. Cl.
CPC ... *H04W 56/0015* (2013.01); *H04W 72/1268* (2013.01); *H04W 72/21* (2023.01)

(58) Field of Classification Search
CPC ......... H04W 56/0015; H04W 72/1268; H04W 72/21
See application file for complete search history.

(56) References Cited

U.S. PATENT DOCUMENTS

| | | | | |
|---|---|---|---|---|
| 2020/0245157 | A1 * | 7/2020 | Chande | H04B 7/0695 |
| 2023/0052556 | A1 * | 2/2023 | Huang | H04W 72/20 |

* cited by examiner

*Primary Examiner* — Mohammad S Anwar
(74) *Attorney, Agent, or Firm* — Arent Fox LLP/Qualcomm Incorporated

(57) ABSTRACT

Aspects described herein relate to a user equipment (UE) receiving, from a network entity, an indication to modify a synchronization signal block (SSB) configuration in a first subset of a set of time periods, and transmitting, for the network entity and based on the indication, uplink control information (UCI) indicating whether the UE is to transmit uplink communications in a second subset of the set of time periods. Other aspects relate to the network entity transmitting the indication and receiving the UCI.

20 Claims, 10 Drawing Sheets

TECHNIQUES FOR ADAPTING TRANSMISSION OF WIRELESS COMMUNICATIONS BASED ON SYNCHRONIZATION SIGNAL BLOCK (SSB) INDICATION

FIELD OF THE DISCLOSURE

Aspects of the present disclosure relate generally to wireless communication systems, and more particularly, to transmitting uplink communications based on a synchronization signal block (SSB) configuration.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to receive, from a network entity, an indication to modify a synchronization signal block (SSB) configuration in a first subset of a set of time periods, and transmit, for the network entity and based on the indication, uplink control information (UCI) indicating whether the apparatus is to transmit uplink communications in a second subset of the set of time periods.

In another aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to transmit, for a user equipment (UE), an indication to modify a SSB configuration in a first subset of set of time periods, and receive, for the UE and based on the indication, UCI indicating whether the UE is to transmit uplink communications in a second subset of the set of time periods.

In another aspect, a method for wireless communication at a UE is provided that includes receiving, from a network entity, an indication to modify a SSB configuration in a first subset of a set of time periods, and transmitting, for the network entity and based on the indication, UCI indicating whether the UE is to transmit uplink communications in a second subset of the set of time periods.

In another aspect, a method for wireless communication at a network entity is provided that includes transmitting, for a UE, an indication to modify a SSB configuration in a first subset of set of time periods, and receiving, for the UE and based on the indication, UCI indicating whether the UE is to transmit uplink communications in a second subset of the set of time periods.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
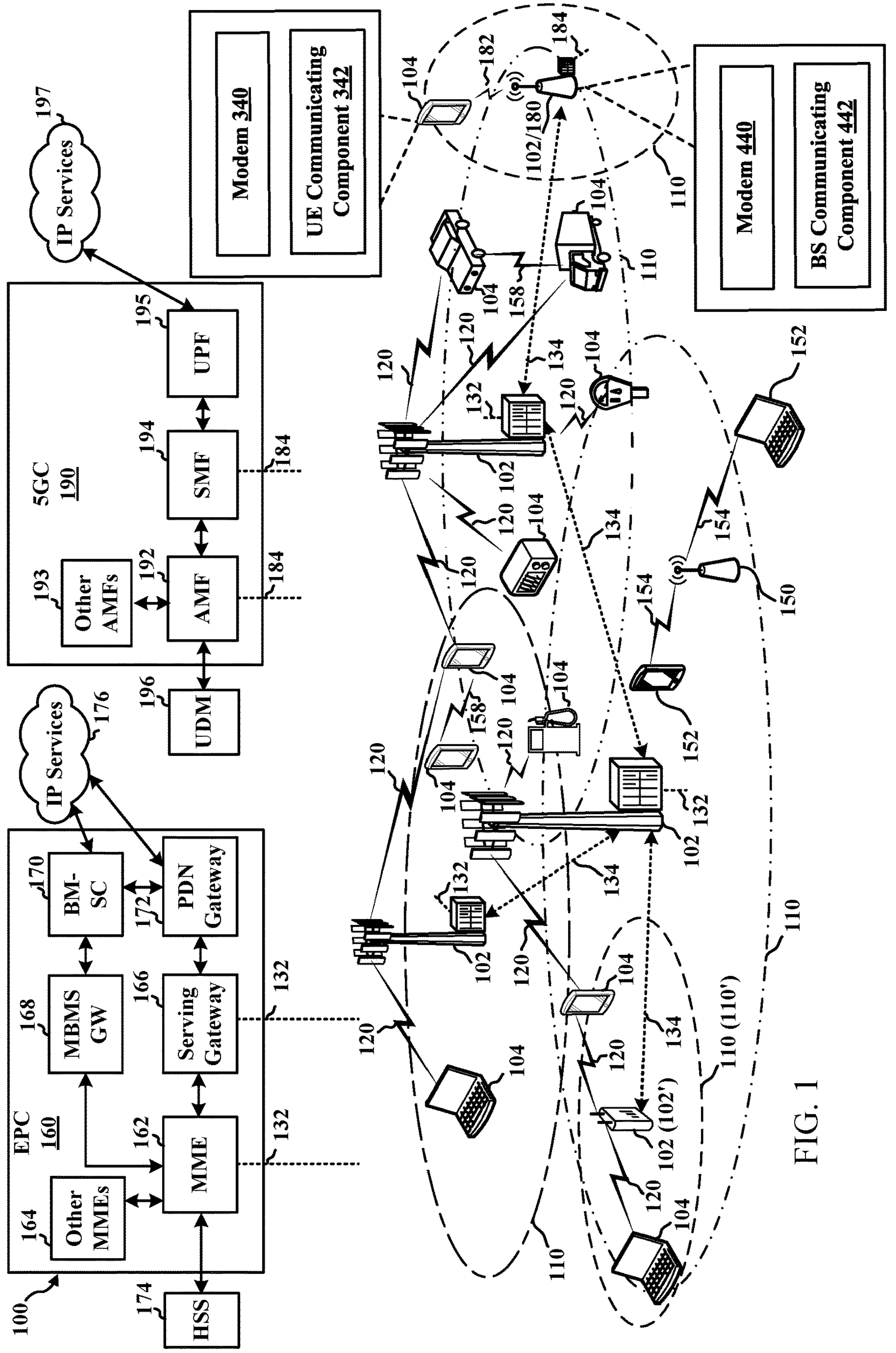
FIG. 1 illustrates an example of a wireless communication system, in accordance with various aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to adapting uplink transmissions based on a synchronization signal block (SSB) configuration or modifications to the SSB configuration. For example, in fifth generation (5G) new radio (NR) or other wireless communication technologies, a network node, such as a base station, gNB, etc., can schedule a user equipment (UE) with resources for transmitting uplink communications to the network (e.g., to the network node or one or more other network nodes). In addition, the network node can configure the UE with resources over which to receive SSBs from the network (e.g., from the network node or one or more other network nodes). The network node can transmit SSBs, which can include a primary synchronization signal (PSS), secondary synchronization signal (SSS), and physical broadcast channel (PBCH), to assist UEs in synchronizing with the network, measuring and/or reporting signal measurements of the SSB signals, selecting beams for beamforming antenna resources to transmit or receive communications, etc.

In 5G NR, the network can adapt SSB transmission in the time domain, e.g., adapt periodicity of SSB transmission, to provide energy savings for the network. In one example, the network can adapt the SSB transmission periodicity using broadcast signaling by a network node (e.g., a system information block (SIB) 1), which can be received and processed by UEs within range of the network node. In some examples, the network node can transmit an indication to adapt (e.g., modify) the SSB configuration, which can include transmitting a media access control (MAC)-control element (CE), downlink control information (DCI) (e.g., in physical downlink control channel (PDCCH) or physical downlink shared channel (PDSCH), etc.), and/or the like, such indication may allow for achieving high energy efficiency and may result in minimal impact on legacy UEs and/or UE latency.

In addition, in 5G NR, the network can configure the UE with resources for transmitting uplink communications (e.g., physical uplink control channel (PUCCH), physical uplink shared channel (PUSCH), etc.) using a configured grant (CG). In this example, the network can indicate, to the UE, scheduling parameters for multiple PUSCH occasions (e.g., by indicating a starting resource and periodicity). The UE can accordingly receive the CG and transmit uplink communications during valid PUSCH occasions indicated by the CG (and using a frequency resource allocation indicated by the CG). In addition, in this example, the UE can send, to the network, uplink transmission opportunity (UTO)-uplink control information (UCI) to indicate PUSCH occasions that are or are not used by the UE for uplink transmissions. For example, the UTO-UCI can include a bitmap of bits where each bit can indicate whether the UE plans to transmit uplink communications in an associated upcoming valid PUSCH occasion. This can allow the UE to skip or cancel uplink transmission in certain PUSCH occasions, and the network can conserve energy by not attempting to receive or process uplink transmissions over the skipped PUSCH occasions.

The bits in the UTO-UCI can refer to valid PUSCH occasions, which may not necessarily include all PUSCH occasions configured by the CG. For example, if the PUSCH occasion overlaps with a semi-statically configured downlink resource (e.g., symbol) or SSB, this PUSCH occasion may not be considered as a valid PUSCH occasion, and thus the UTO-UCI bitmap may not need to include a bit for such PUSCH occasions. Aspects described herein relate to whether the UE considers a PUSCH occasion as a valid PUSCH occasion when the network modifies the SSB configuration. Certain aspects relate to UE functionality when the UE receives an indication adapting or modifying SSBs in the time domain before the UE sends the UTO-UCI, and other aspects relate to UE functionality when the UE receives an indication adapting or modifying SSBs in the time domain after the UE sends the UTO-UCI.

Thus, in accordance with aspects described herein, the UE can effectively communicate UTO-UCI to the network even when the network modifies the SSB configuration, which may result in some PUSCH occasions becoming invalid. This can improve quality of communications between the UE and the network and avoid missed communication opportunities or retransmissions where the UE may otherwise transmit, or indicate transmission in UTO-UCI of, uplink communications in occasions where the network is transmitting SSB.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for transmitting UCI indicating whether the UE is transmitting uplink communications based on a received indication of SSB configuration modification, in accordance with aspects described herein. In addition, some nodes may have a modem 440 and BS communicating component 442 for indicating modification of SSB configuration, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. As described herein, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, BS communicating component 442 can transmit, for one or more UEs 104, an indication to modify a SSB configuration in at least a portion of a set of time periods. For example, the time periods may correspond to one or more symbols (e.g., orthogonal frequency division multiplexing (OFDM) symbols, single carrier-frequency division multiplexing (SC-FDM) symbols, and/or the like), one or more slots of multiple symbols, or other time divisions defined in a wireless communication technology, such as 5G NR. In an example, UE communicating component 342 can transmit, for the base station 102, UCI indicating whether valid PUSCH occasions are used for uplink transmissions, and can determine which PUSCH occasions are valid and indicated in the UCI based on the indication to modify the SSB configuration and/or based on when the indication is received.

Figure 2:
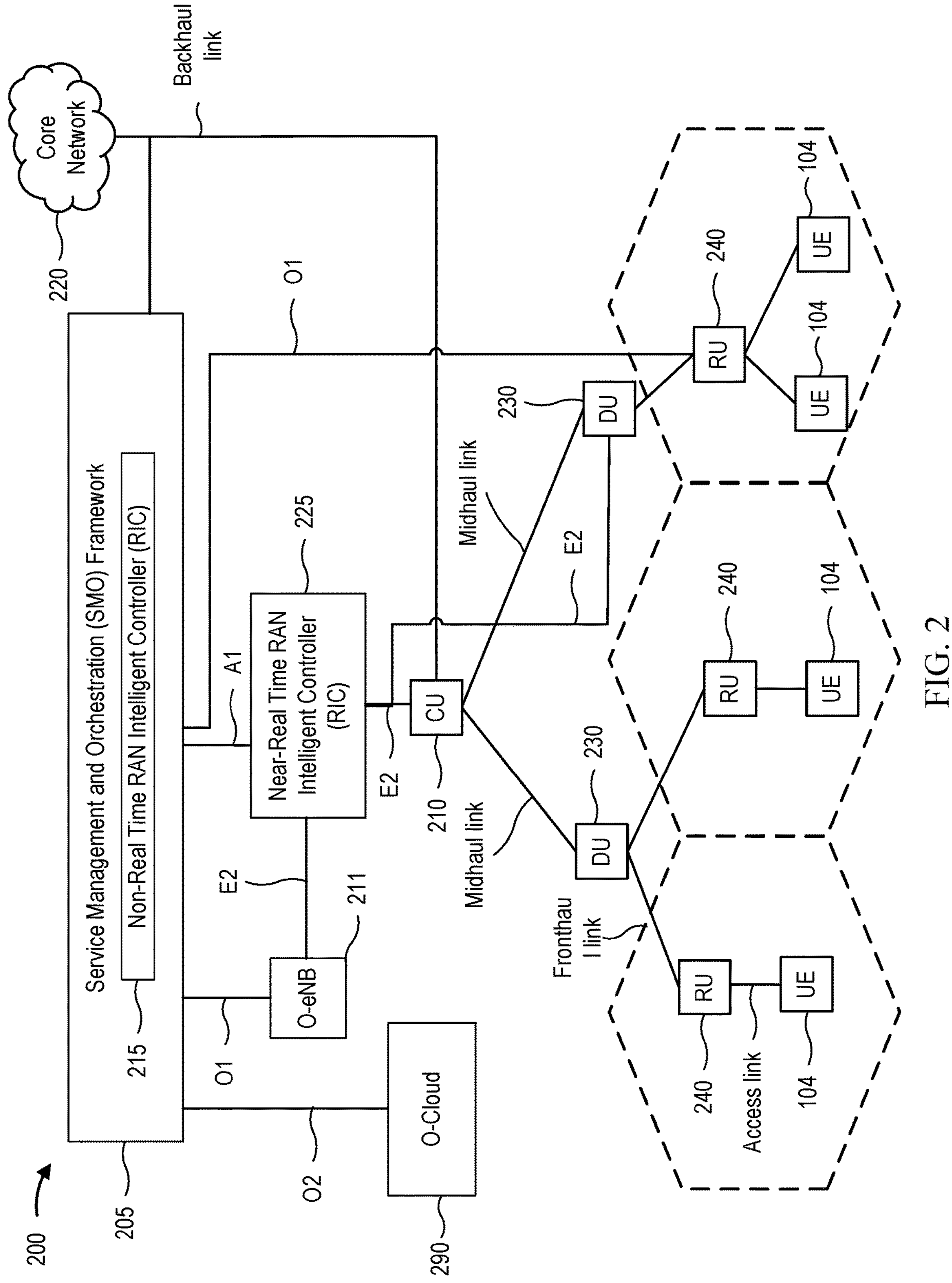
FIG. 2 is a diagram illustrating an example of disaggregated base station architecture, in accordance with various aspects described herein.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
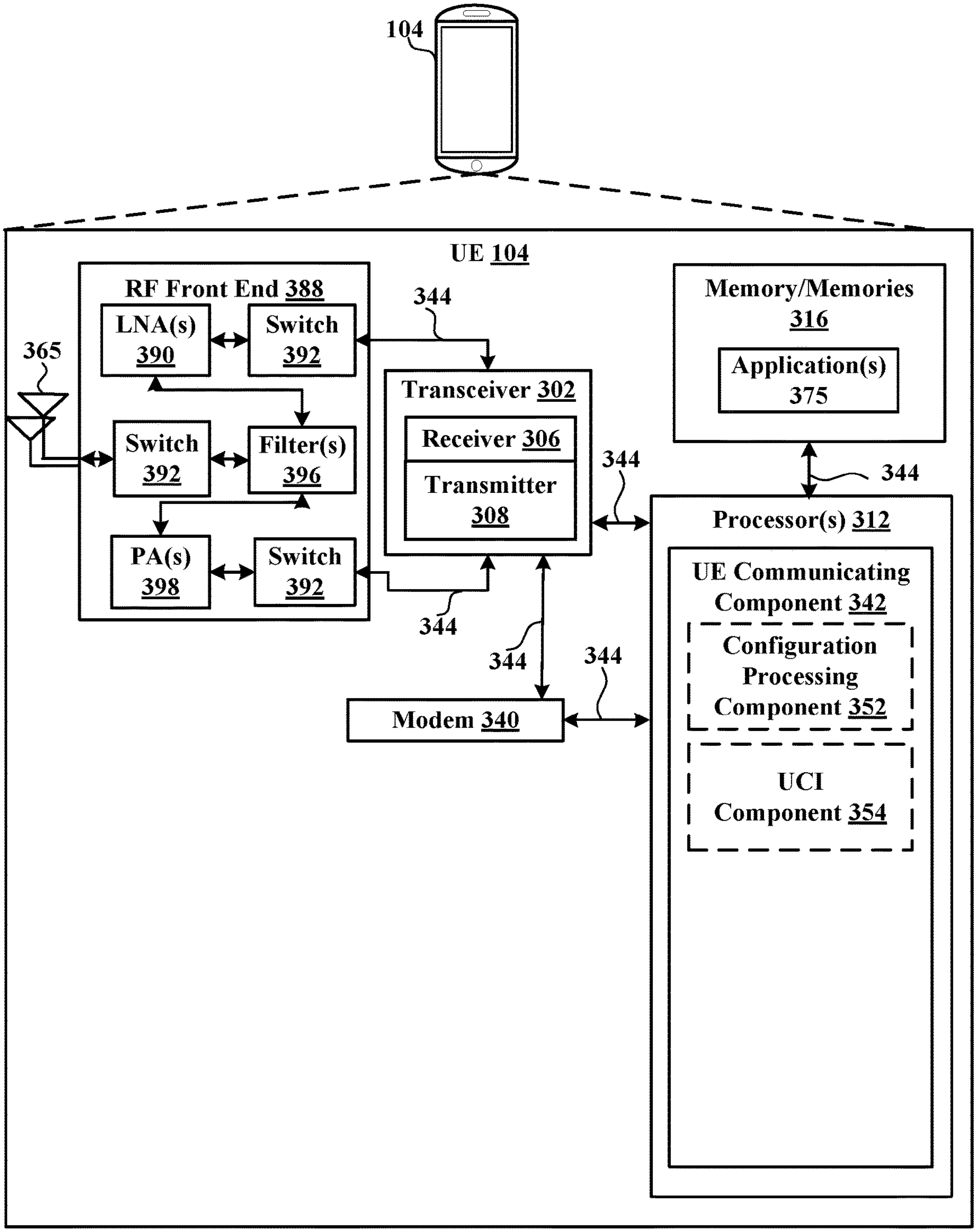
FIG. 3 is a block diagram illustrating an example of a user equipment (UE), in accordance with various aspects described herein.
Figure 4:
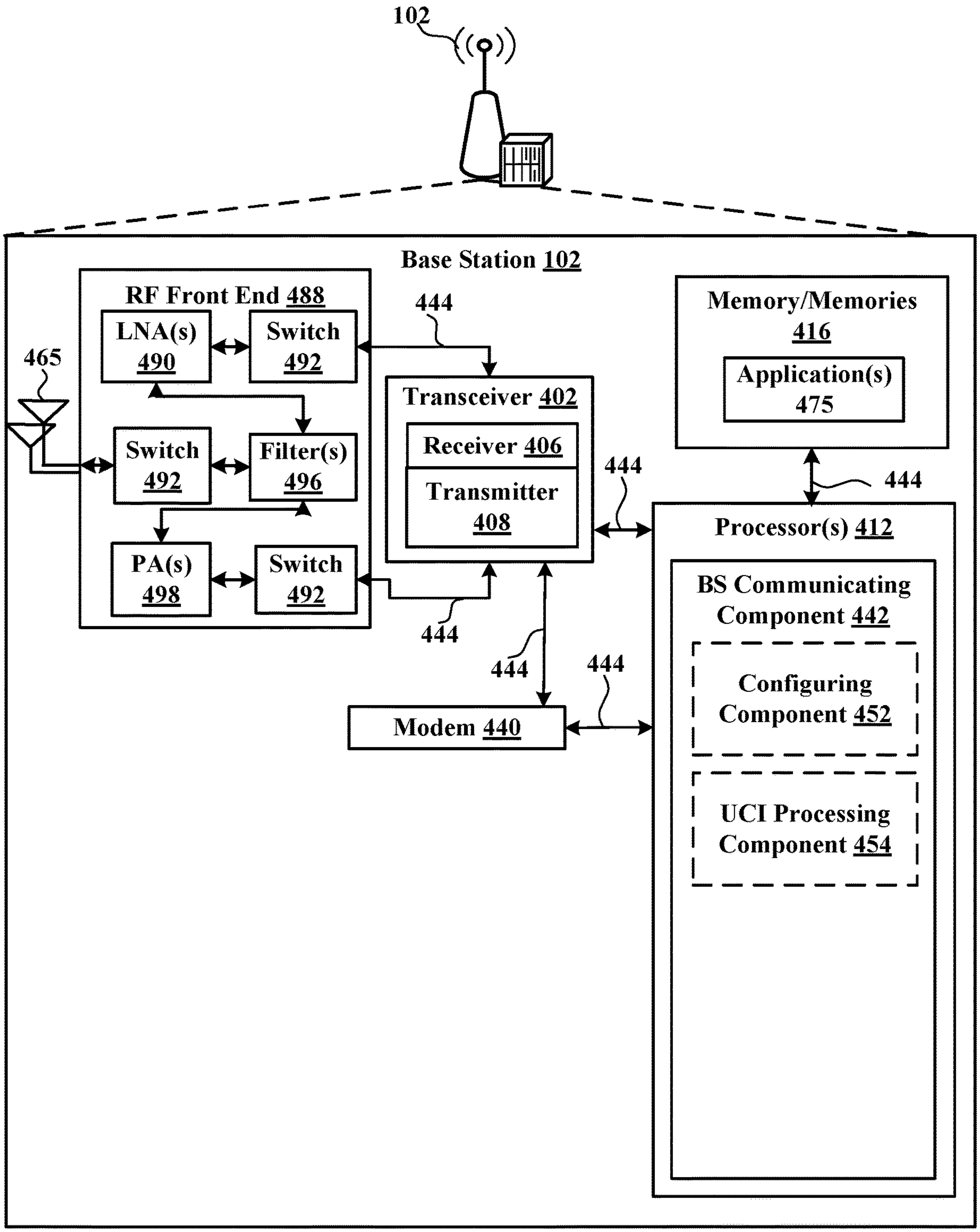
FIG. 4 is a block diagram illustrating an example of a base station, in accordance with various aspects described herein.
Figure 5:
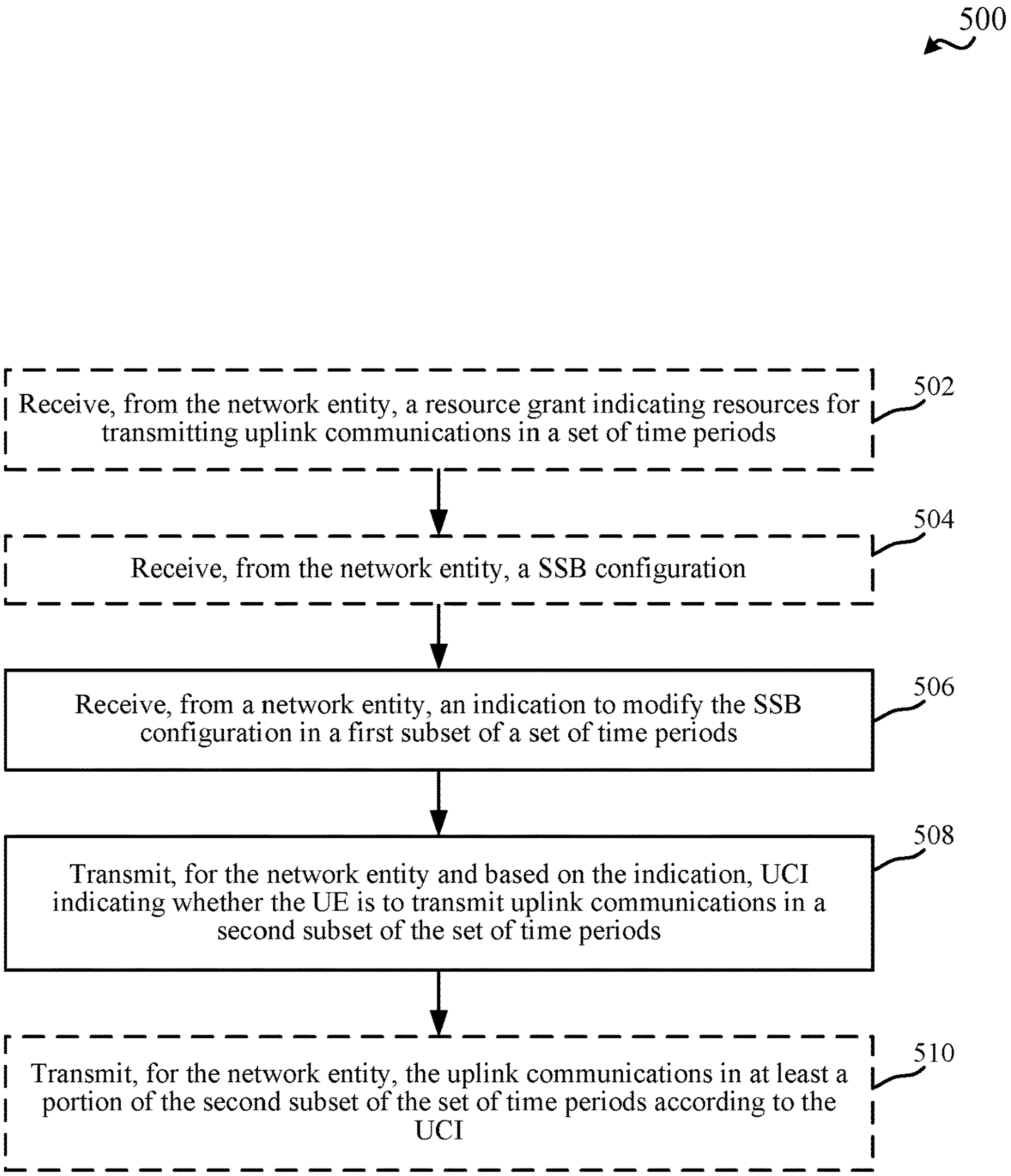
FIG. 5 is a flow chart illustrating an example of a method for transmitting uplink control information (UCI) indicating whether a UE is transmitting uplink communications based on a received indication of synchronization signal block (SSB) configuration modification, in accordance with aspects described herein.
Figure 6:
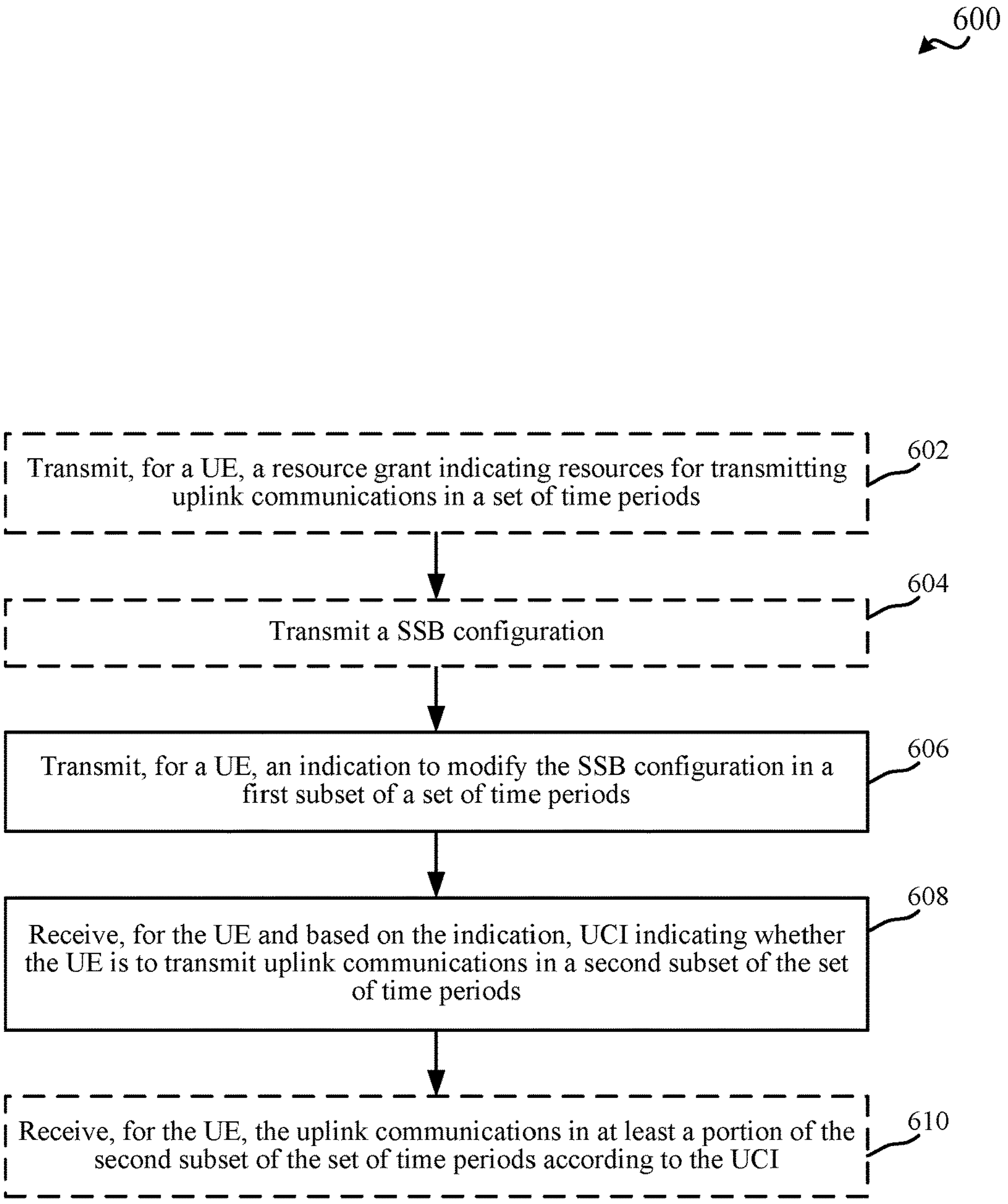
FIG. 6 is a flow chart illustrating an example of a method for transmitting an indication of modifying a SSB configuration, in accordance with aspects described herein.

Turning now to FIGS. 3-10, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and one or more memories 316 and one or more transceivers 302 in communication via one or more buses 344. For example, the one or more processors 312 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 316 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 312, one or more memories 316, and one or more transceivers 302 may operate in conjunction with modem 340 and/or UE communicating component 342 for transmitting UCI indicating whether the UE is transmitting uplink communications based on a received indication of SSB configuration modification, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory/memories 316 may be configured to store data used herein and/or local versions of applications 375 or UE communicating component 342 and/or one or more of its subcomponents being executed by at least one processor 312. Memory/memories 316 can include any type of computer-readable medium usable by a computer or at least one processor 312, such as random access memory (RAM), read only memory (ROM), electronically erasable programmable ROM (EEPROM), tapes, volatile memory, non-volatile memory, optical disk storage, magnetic disk storage, other magnetic storage devices, combinations of the aforementioned types of computer-readable media, or any other medium that can be used to store computer executable code in the form of instructions or data structures that can be accessed by a computer. In an aspect, for example, memory/memories 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), signal-to-interference-and-noise ratio (SINR), reference signal received power (RSRP), reference signal received quality (RSRQ), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAS) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a configuration processing component 352 for processing a configuration transmitted by a network entity, such as a SSB configuration configuring SSBs to be transmitted by the network entity, a configured grant configuration configuring resources for uplink transmissions, etc., and/or a UCI component 354 for generating and/or transmitting UCI for the network entity, in accordance with aspects described herein.

In an aspect, the processor(s) 312 may correspond to one or more of the processors described in connection with the UE in FIG. 10. Similarly, the memory/memories 316 may correspond to the one or more memories described in connection with the UE in FIG. 10.

Referring to FIG. 4, one example of an implementation of base station 102 (e.g., a base station 102 and/or gNB 180, as described above) may include a variety of components, some of which have already been described above, but including components such as one or more processors 412 and one or more memories 416 and one or more transceivers 402 in communication via one or more buses 444. For example, the one or more processors 412 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 416 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 412, one or more memories 416, and one or more transceivers 402 may operate in conjunction with modem 440 and/or BS communicating component 442 for indicating modification of SSB configuration, in accordance with aspects described herein.

The transceiver 402, receiver 406, transmitter 408, one or more processors 412, memory/memories 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a configuring component 452 for generating and/or transmitting one or more configurations for a UE, such as a SSB configuration configuring SSBs to be transmitted by the network entity, a configured grant configuration configuring resources for uplink transmissions, etc., and/or a UCI processing component 454 for receiving and/or processing UCI received for a UE, in accordance with aspects described herein.

In an aspect, the processor(s) 412 may correspond to one or more of the processors described in connection with the base station in FIG. 10. Similarly, the memory/memories 416 may correspond to the one or more memories described in connection with the base station in FIG. 10.

FIG. 5 illustrates a flow chart of an example of a method 500 for transmitting UCI indicating whether a UE is transmitting uplink communications based on a received indication of SSB configuration modification, in accordance with aspects described herein. FIG. 6 illustrates a flow chart of an example of a method 600 for transmitting an indication of modifying a SSB configuration, in accordance with aspects described herein. In an example, a UE 104 can perform the functions described in method 500 shown in FIG. 5 using one or more of the components described in FIGS. 1 and/or 3. In an example, a node scheduling the UE 104 with communication resources, such as a base station 102 or gNB 180, a monolithic base station or gNB, a portion of a disaggregated base station or gNB, a UE in sidelink communication, etc., can perform the functions described in method 600 shown in FIG. 6 using one or more of the components described in FIGS. 1 and/or 4. Methods 500 and 600 are described in conjunction with one another for ease of explanation; however, the methods 500 and 600 are not required to be performed together and indeed can be performed independently using separate devices.

In method 600, optionally at Block 602, a resource grant indicating resources for transmitting uplink communications in a set of time periods can be transmitted for a UE. In an aspect, configuring component 452, e.g., in conjunction with processor(s) 412, memory/memories 416, transceiver 402, BS communicating component 442, etc., can transmit, for the UE (e.g., UE 104), the resource grant indicating resources for transmitting uplink communications in a set of time periods. For example, configuring component 452 can generate the resource grant for the UE 104, which can be a CG indicating a periodicity in the time domain for the resources, a frequency domain resource allocation, etc. In an example, configuring component 452 can transmit the CG to the UE 104 using semi-static (e.g., radio resource control (RRC)) signaling. In another example, configuring component 452 may activate PUSCH occasions according to the CG using dynamic signaling (e.g., MAC-CE or DCI). In addition, in some examples, configuring component 452 can configure, for the UE (e.g., using semi-static and/or dynamic signaling), a slot configuration indicating slots or symbols within the slots as being for downlink communications, uplink communications, or flexible.

In method 500, optionally at Block 502, a resource grant indicating resources for transmitting uplink communications in a set of time periods can be received from the network entity. In an aspect, configuration processing component 352, e.g., in conjunction with processor(s) 312, memory/memories 316, transceiver 302, UE communicating component 342, etc., can receive, from the network entity, the resource grant indicating resources for transmitting uplink communications in the set of time periods. For example, as described, the resource grant can include a CG received in semi-static (e.g., RRC signaling), an activation of CG resources received in dynamic signaling (e.g., MAC-CE or DCI), etc. In any case, for example, configuration processing component 352 can receive the resource grant and determine, based on the resource grant, resources for transmitting uplink communications (e.g., PUCCH or PUSCH). UE communicating component 342 can transmit uplink communications in the resources indicated by the resource grant.

In method 600, optionally at Block 604, a SSB configuration can be transmitted. In an aspect, configuring component 452, e.g., in conjunction with processor(s) 412, memory/memories 416, transceiver 402, BS communicating component 442, etc., can transmit the SSB configuration. For example, configuring component 452 can transmit the SSB configuration in broadcast signaling that can be received by multiple UEs, such as SIB 1. In addition, the SSB configuration can indicate time periods (e.g., symbols, slots, or other time divisions) over which the network entity transmits SSBs.

In method 500, optionally at Block 504, a SSB configuration can be received from a network entity. In an aspect, configuration processing component 352, e.g., in conjunction with processor(s) 312, memory/memories 316, transceiver 302, UE communicating component 342, etc., can receive, from the network entity, the SSB configuration. As described, for example, configuration processing component 352 can receive the SSB configuration in SIB 1 or other broadcast signaling. In an example, configuration processing component 352 can process the SSB configuration and determine parameters for receiving SSBs from the network entity, such as time periods over which to receive SSBs. UE communicating component 342 can accordingly receive the SSBs from the network entity in the indicated time periods, in some examples. In addition, in an example, UE communicating component 342 can refrain from transmitting uplink communications in the indicated time periods.

In method 600, at Block 606, an indication to modify the SSB configuration in a first subset of a set of time periods can be transmitted for a UE. In an aspect, configuring component 452, e.g., in conjunction with processor(s) 412, memory/memories 416, transceiver 402, BS communicating component 442, etc., can transmit, for the UE (e.g., UE 104), the indication to modify the SSB configuration in the first subset of the set of time periods. For example, configuring component 452 can transmit the indication to the UE in dynamic signaling (e.g., MAC-CE or DCI) indicating modification of the SSB configuration. In other examples, the indication may be transmitted using semi-static signaling (e.g., RRC), based on occurrence of one or more conditions or detected events, etc. For example, the indication can indicate that an SSB is being added (e.g., an SSB that is not in the original SSB configuration is being transmitted) or that a configured SSB is being removed (e.g., an SSB that is in the original SSB configuration is not being transmitted). In addition, the set of time periods can include time periods (e.g., symbols, slots, or other time divisions) occurring the future.

In method 500, at Block 506, an indication to modify the SSB configuration in a first subset of a set of time periods can be received from a network entity. In an aspect, configuration processing component 352, e.g., in conjunction with processor(s) 312, memory/memories 316, transceiver 302, UE communicating component 342, etc., can receive, from the network entity, the indication to modify the SSB configuration in the first subset of the set of time periods. For example, configuration processing component 352 can receive the indication from the network entity in dynamic signaling (e.g., MAC-CE or DCI), as described, which can indicate modification of the originally received SSB configuration (e.g., to add or remove a SSB in at least a portion of a set of time periods). As described above, the UE 104 (e.g., via UCI component) can transmit UCI (e.g., UTO-UCI) including a bitmap of bits to indicate whether PUSCH is transmitted in multiple upcoming valid PUSCH occasions. In an example, UCI component 354 can use the indication to determine which PUSCH occasions are valid (and thus the corresponding bitmap values), and/or whether to transmit PUSCH in a valid PUSCH occasion that may become invalid (based on the modified SSB configuration), etc.

In method 500, at Block 508, UCI indicating whether the UE is to transmit uplink communications in a second subset of the set of time periods can be transmitted for the network entity and based on the indication. In an aspect, UCI component 354, e.g., in conjunction with processor(s) 312, memory/memories 316, transceiver 302, UE communicating component 342, etc., can transmit, for the network entity and based on the indication, UCI indicating whether the UE 104 is to transmit uplink communications in the second subset of the set of time periods. For example, as described above and further herein, UCI component 354 can determine, based on the indication to modify the SSB configuration, which PUSCH occasions are considered valid in generating the bitmap.

In method 600, at Block 608, UCI indicating whether the UE is to transmit uplink communications in a second subset of the set of time periods can be received for the UE and based on the indication. In an aspect, UCI processing component 454, e.g., in conjunction with processor(s) 412, memory/memories 416, transceiver 402, BS communicating component 442, etc., can receive, for the UE and based on the indication, the UCI indicating whether the UE is to transmit uplink communications in the second subset of the set of time periods. For example, UCI processing component 454 can receive the UCI from the UE 104, and can process the UCI to determine over which PUSCH occasions the UE 104 is planning to transmit uplink communications. In an example, UCI processing component 454 can use similar logic as UCI component 354, as described above and further herein, to determine which PUSCH occasions are valid or invalid, for determining to which PUSCH occasions the bits in the bitmap correspond.

In method 500, optionally at Block 510, the uplink communications can be transmitted, for the network entity, in at least a portion of the second subset of the set of time periods according to the UCI. In an aspect, UE communicating component 342, e.g., in conjunction with processor(s) 312, memory/memories 316, transceiver 302, etc., can transmit, for the network entity, the uplink communications in at least the portion of the second subset of the set of time periods according to the UCI. Thus, for example, UE communicating component 342 can transmit uplink communications in the valid PUSCH occasions that correspond to the bitmap (or may not transmit in one or more of the valid PUSCH occasions regardless of the indication in the bitmap in some cases).

In method 600, optionally at Block 610, the uplink communications can be received, for the UE, in at least a portion of the second subset of the set of time periods according to the UCI. In an aspect, BS communicating component 442, e.g., in conjunction with processor(s) 412, memory/memories 416, transceiver 402, etc., can receive, for the UE, the uplink communications in at least the portion of the second subset of the set of time periods according to the UCI. Thus, for example, BS communicating component 442 can receive uplink communications in the valid PUSCH occasions that correspond to the bitmap in the UCI (or may not receive in one or more of the valid PUSCH occasions regardless of the indication in the bitmap in some cases). As described above and further herein, UE communicating component 342 and BS communicating component 442 can use similar logic to determine over which PUSCH occasions to transmit or receive uplink communications.

In one example, where configuration processing component 352 receives the indication to modify the SSB configuration before (or at least a threshold period of time before) sending the UTO-UCI, UCI component 354 can consider the valid/invalid PUSCH occasions based on the SSB configuration before the indication is received (e.g., regardless of the modifications indicated by the indication). In an example, the threshold period of time can be a processing time threshold related to a time the UE 104 needs to process the received configuration. For example, the threshold period of time can be $T_{proc,2}$, as defined in 5G NR. In this example, if the indication indicates removal of an SSB from the current SSB configuration (and thus a previously invalid PUSCH becomes valid), which is referred to as "Case 1" in the example shown in FIG. 7, UCI component 354 can still consider this PUSCH occasion as invalid in generating the bitmap for indicating resources used for uplink transmissions. In addition, in this example, if the indication indicates addition of an SSB to the current SSB configuration (and thus a previously valid PUSCH becomes invalid), which is referred to as "Case 2" in the example shown in FIG. 7, UCI component 354 may still consider this PUSCH occasion as valid in generating the bitmap, but UE communicating component 342 may refrain from transmitting uplink communications in this PUSCH occasion.

Figure 7:
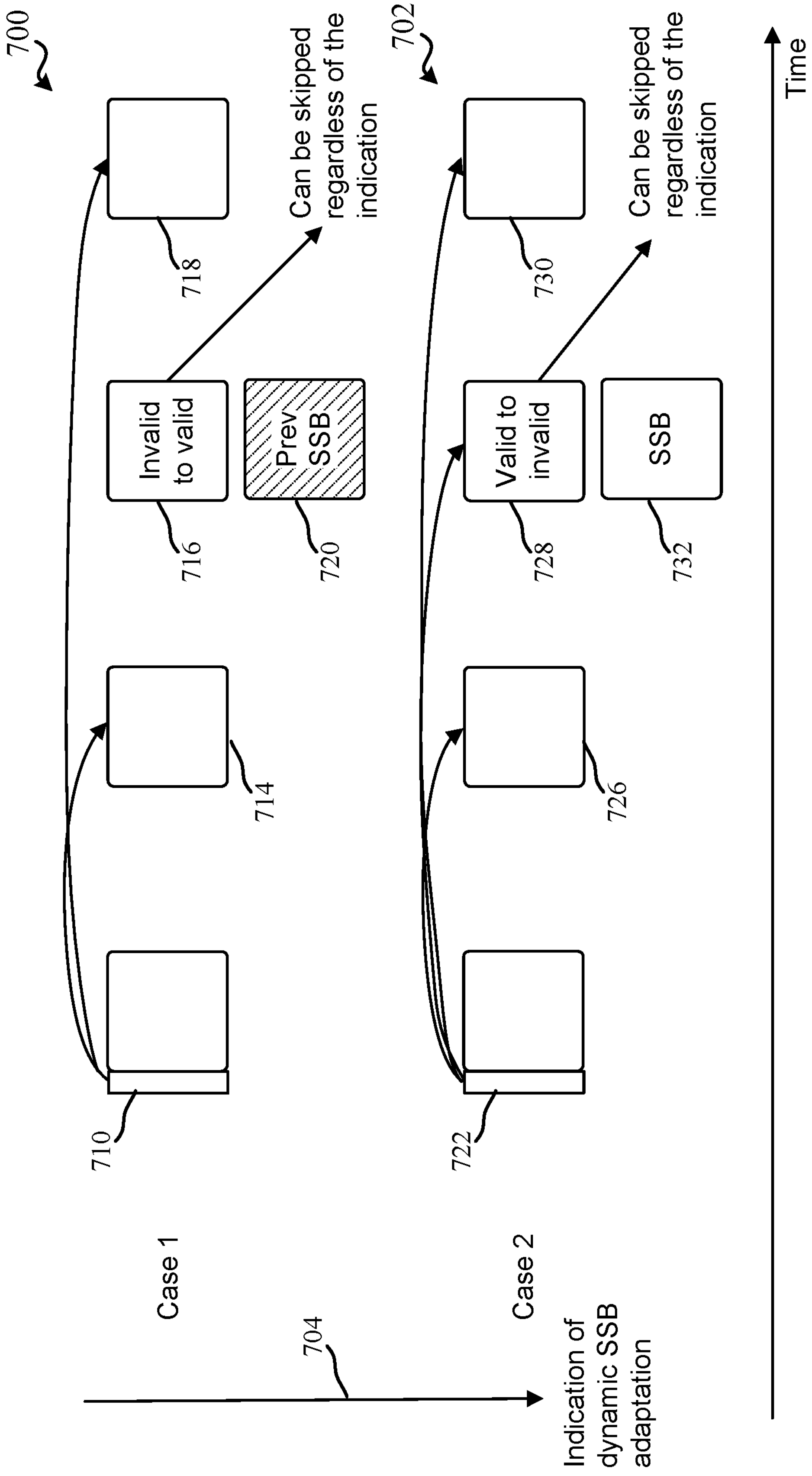
FIG. 7 illustrates examples of timelines where the indication to modify a SSB configuration is received before transmitting UCI indicating whether the UE is transmitting uplink communications, in accordance with aspects described herein.

FIG. 7 illustrates examples of timelines 700 and 702 where the indication to modify a SSB configuration is received before transmitting UCI indicating whether the UE is transmitting uplink communications, in accordance with aspects described herein. Timeline 700 illustrates an example of Case 1, described above, where the indication of modifying the SSB configuration (indication of dynamic SSB adaptation) is received at 704 before transmitting UCI 710. UCI 710 can include UTO-UCI, as described, which can include a bitmap indicating whether uplink communications are transmitted in valid PUSCH occasions 714 and 718. PUSCH occasion 716 may be invalid according to the SSB configuration before modification, but may be indicated in the indication to modify the SSB configuration to remove the SSB (and thus previously configured SSB 720 is not transmitted). In this example, as described above, UCI component 354 can generate the UCI to still consider this PUSCH occasion 716 invalid and not include a bit for this PUSCH occasion 716 (and only include bits for PUSCH occasions 714 and 718). In addition, in this example, UE communicating component 342 can refrain from transmitting uplink communications in this PUSCH occasion 716. In an example, UCI processing component 454 can similarly process the UCI considering this PUSCH occasion 716 as invalid (and thus skip this PUSCH occasion 716 in mapping the bits of the bitmap to PUSCH occasions 714 and 718). In addition, for example, BS communicating component 442 can similarly refrain from receiving uplink communications in this PUSCH occasion 716.

Timeline 702 illustrates an example of Case 2, described above, where the indication of modifying the SSB configuration (indication of dynamic SSB adaptation) is received at 704 before transmitting UCI 722. UCI 722 can include UTO-UCI, as described, which can include a bitmap indicating whether uplink communications are transmitted in valid PUSCH occasions 726, 728, and 730. PUSCH occasion 728 may be valid according to the SSB configuration before modification, but may be indicated in the indication to modify the SSB configuration to add an SSB 732, rendering this PUSCH occasion 728 invalid. In this example, as described above, UCI component 354 can generate the UCI to still consider this PUSCH occasion 728 valid and can include a bit for this PUSCH occasion 728 as well, but UE communicating component 342 can refrain from transmitting uplink communications in this PUSCH occasion 728. In an example, UCI processing component 454 can similarly process the UCI considering this PUSCH occasion 728 as valid in mapping the bits of the bitmap to PUSCH occasions 726, 728, and 730. In addition, for example, BS communicating component 442 can also refrain from receiving uplink communications in this PUSCH occasion 728, regardless of the UTO-UCI bitmap value for this PUSCH occasion 728, based on the SSB configuration indicating to add a SSB 732 at this PUSCH occasion 728.

In another example, where configuration processing component 352 receives the indication to modify the SSB configuration before (or at least a threshold period of time before) sending the UTO-UCI, UCI component 354 can consider the valid/invalid PUSCH occasions based on the SSB configuration after the indication is received (e.g., based on the modifications to the SSB configuration indicated by the indication). In an example, the threshold period of time can be a processing time threshold related to a time the UE 104 needs to process the received configuration. For example, the threshold period of time can be $T_{proc,2}$, as defined in 5G NR. In this example, if the indication indicates removal of an SSB from the current SSB configuration (and thus a previously invalid PUSCH becomes valid), which is referred to as "Case 1" in the example shown in FIG. 8, UCI component 354 can consider this PUSCH occasion as now valid in generating the bitmap for indicating resources used for uplink transmissions. In addition, in this example, if the indication indicates addition of an SSB to the current SSB configuration (and thus a previously valid PUSCH becomes invalid), which is referred to as "Case 2" in the example shown in FIG. 8, UCI component 354 may consider this PUSCH occasion as now invalid in generating the bitmap.

Figure 8:
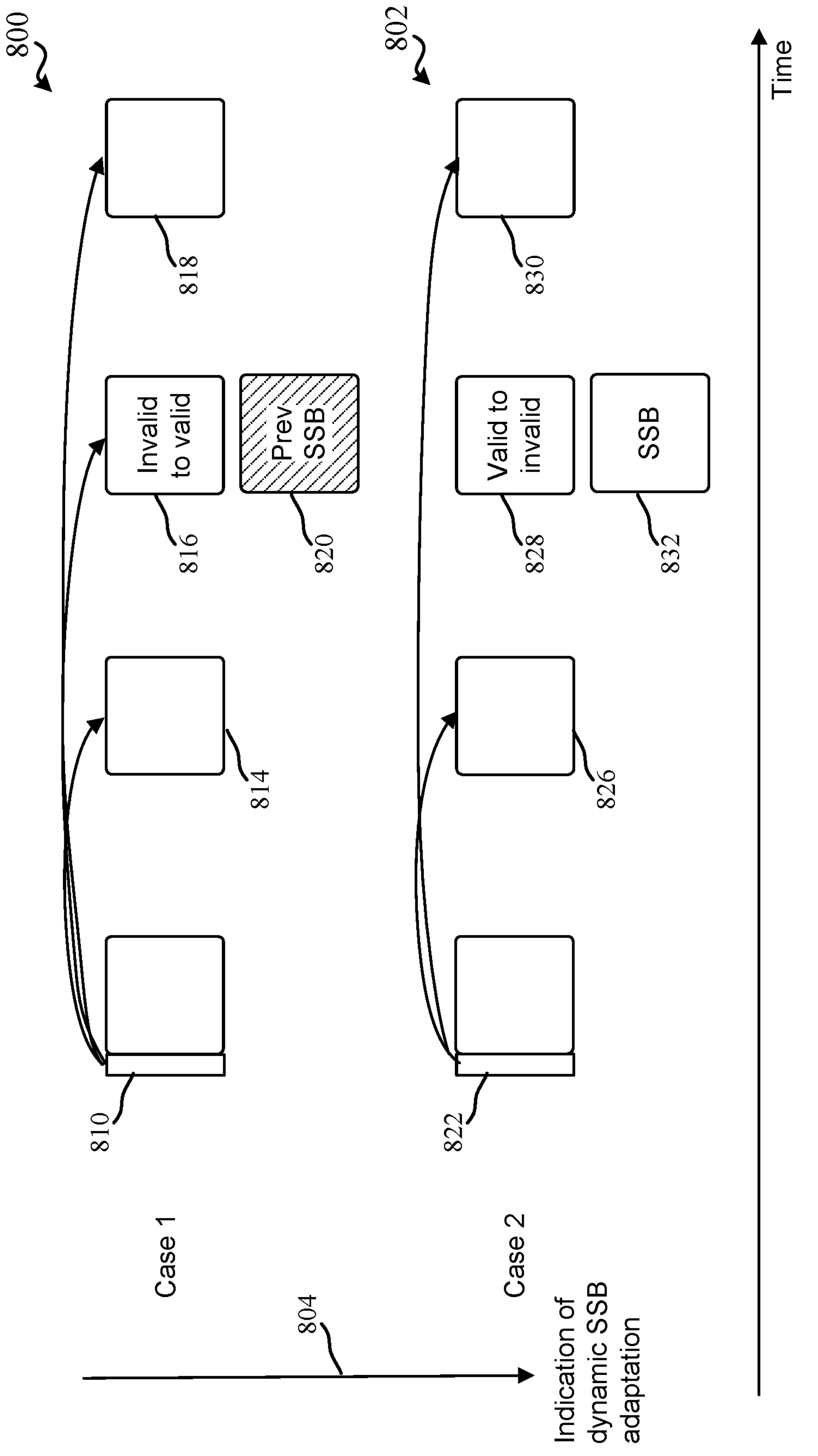
FIG. 8 illustrates examples of timelines where the indication to modify a SSB configuration is received and considered before transmitting UCI indicating whether the UE is transmitting uplink communications, in accordance with aspects described herein.

FIG. 8 illustrates examples of timelines 800 and 802 where the indication to modify a SSB configuration is received and considered before transmitting UCI indicating whether the UE is transmitting uplink communications, in accordance with aspects described herein. Timeline 800 illustrates an example of Case 1, described above, where the indication of modifying the SSB configuration (indication of dynamic SSB adaptation) is received at 804 before transmitting UCI 810. UCI 810 can include UTO-UCI, as described, which can include a bitmap indicating whether uplink communications are transmitted in valid PUSCH occasions 814, 816, and 818. PUSCH occasion 816 may be invalid according to the SSB configuration before modification, but may be indicated in the indication to modify the SSB configuration to remove the SSB (and thus previously configured SSB 820 is not transmitted). In this example, as described above, UCI component 354 can generate the UCI to consider this PUSCH occasion 816 as valid and can include a bit for this PUSCH occasion 816. In an example, UCI processing component 454 can similarly process the UCI considering this PUSCH occasion 816 as valid based on the modification of the SSB configuration to remove the previously configured SSB 820.

Timeline 802 illustrates an example of Case 2, described above, where the indication of modifying the SSB configuration (indication of dynamic SSB adaptation) is received at 804 before transmitting UCI 822. UCI 822 can include UTO-UCI, as described, which can include a bitmap indicating whether uplink communications are transmitted in valid PUSCH occasions 826 and 830. PUSCH occasion 828 may be valid according to the SSB configuration before modification, but may be indicated in the indication to modify the SSB configuration to add an SSB 832, rendering this PUSCH occasion 828 invalid. In this example, as described above, UCI component 354 can generate the UCI considering this PUSCH occasion 828 as invalid and can not include a bit for this PUSCH occasion 828. In addition, UE communicating component 342 can refrain from transmitting uplink communications in this now invalid PUSCH occasion 828. In an example, UCI processing component 454 can similarly process the UCI considering this PUSCH occasion 828 as invalid in mapping the bits of the bitmap to PUSCH occasions 826 and 830 (and not PUSCH occasion 828) based on the modification of the SSB configuration to add SSB 832 in PUSCH occasion 828. In addition, for example, BS communicating component 442 can also refrain from receiving uplink communications in this PUSCH occasion 828.

In another example, where configuration processing component 352 receives the indication to modify the SSB configuration after (or at least a threshold period of time after) sending the UTO-UCI, UCI component 354 can transmit uplink communications according to the UTO-UCI that it transmitted to the network entity, but can refrain from transmitting over a PUSCH occasion where an SSB is introduced (regardless of the UTO-UCI bit value for that PUSCH occasion). An example is illustrated in FIG. 9.

Figure 9:
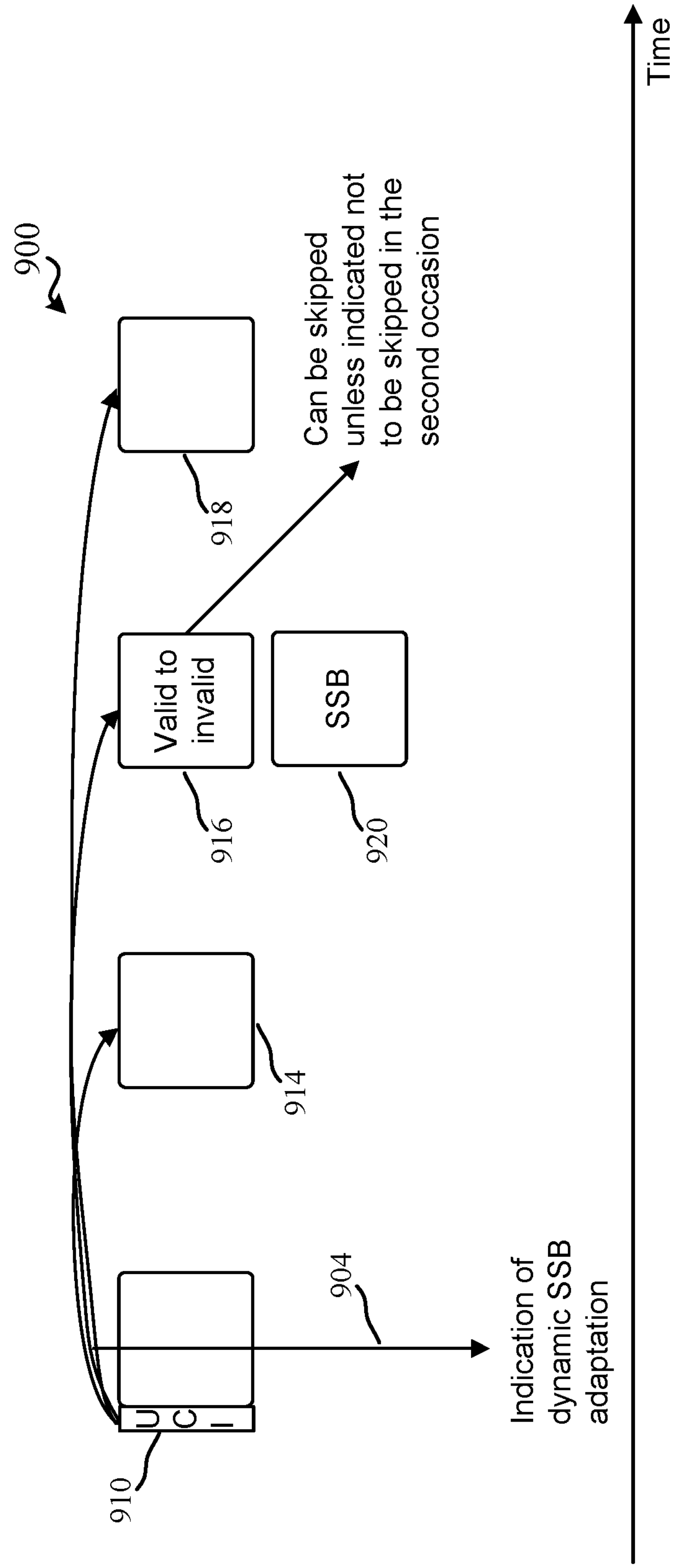
FIG. 9 illustrates an example of a timeline where the indication to modify a SSB configuration is received and considered after transmitting UCI indicating whether the UE is transmitting uplink communications, in accordance with aspects described herein.

FIG. 9 illustrates an example of a timeline 900 where the indication to modify a SSB configuration is received and considered after transmitting UCI indicating whether the UE is transmitting uplink communications, in accordance with aspects described herein. In timeline 900, the indication of modifying the SSB configuration (indication of dynamic SSB adaptation) is received at 904, which is after transmitting UCI 910. UCI 910 can include UTO-UCI, as described, which can include a bitmap indicating whether uplink communications are transmitted in valid PUSCH occasions 914, 916, and 918. PUSCH occasion 916 may be valid according to the SSB configuration before modification, but may be indicated in the indication to modify the SSB configuration to add SSB 920 in PUSCH occasion 916, rendering PUSCH occasion 916 invalid. As the UTO-UCI is transmitted, however, UE communicating component 342 can follow the indicated bitmap, but can refrain from transmitting uplink communications in PUSCH occasion 916 based on the modified SSB configuration, regardless of the UTO-UCI bit value for PUSCH occasion 916. In an example, UCI processing component 454 can similarly process the UCI considering this PUSCH occasion 916 as valid (e.g., for the purpose of mapping the other bit to PUSCH occasion 918), but BS communicating component 442 can refrain from receiving the uplink communications over PUSCH occasion 916 based on the modification of the SSB configuration to add SSB 920.

In some examples described herein, the UTO-UCI indication may be applicable only to valid CG PUSCH transmission occasions (TOs). In an example, in 5G NR, (e.g., in technical specification (TS) 38.213), a procedure for a UE reporting UTO-UCI may include the following. If the UE is provided nrof_UTO_UCI with value equal to $O^{UTO\text{-}UCI}$ in configuredGrantConfig of a CG-PUSCH configuration, the UE can multiplex UTO-UCI represented by a bitmap of $O^{UTO\text{-}UCI}$ bits in each CG-PUSCH transmission for the CG-PUSCH configuration. The $O^{UTO\text{-}UCI}$ bits of $$UTO-UCI, \tilde{o}_0^{UTO-UCI}, \tilde{o}_1^{UTO-UCI}, \ldots, \tilde{o}_{o^{UTO-UCI}-1}^{UTO-UCI},$$

can have a one-to-one mapping to $O^{UTO\text{-}UCI}$ subsequent CG-PUSCH TOs in ascending order of start time. For unpaired spectrum operation, the $O^{UTO\text{-}UCI}$ subsequent CG-PUSCH TOs can exclude invalid ones where a UE does not transmit a PUSCH due to collision of the PUSCH with the DL symbol(s) indicated by tdd-UL-DL-ConfigurationCommon or tdd-UL-DL-ConfigurationDedicated if provided, or a symbol(s) of an SS/PBCH block with index provided by ssb-PositionsInBurst based on the procedures in Clause 11.1 For UE that is indicated to cancel an SSB, the UE may consider the PUSCH occasion as valid and may not exclude the indication from the UTO-UCI if the indication is received $T_{proc,2}$ or N2 from the first symbol of the PUSCH. A bit value of '0' can indicate that the UE may transmit CG-PUSCH, and a bit value of '1' can indicate that the UE may not transmit CG-PUSCH, in a corresponding CG-PUSCH TO. When the UE indicates by UTO-UCI a value of '1' for a CG-PUSCH TO, the UE may continue to indicate the value of '1' for the CG-PUSCH TO by UTO-UCI multiplexed in subsequent CG-PUSCH transmissions, and the UE may not transmit CG-PUSCH in the CG-PUSCH TO.

Figure 10:
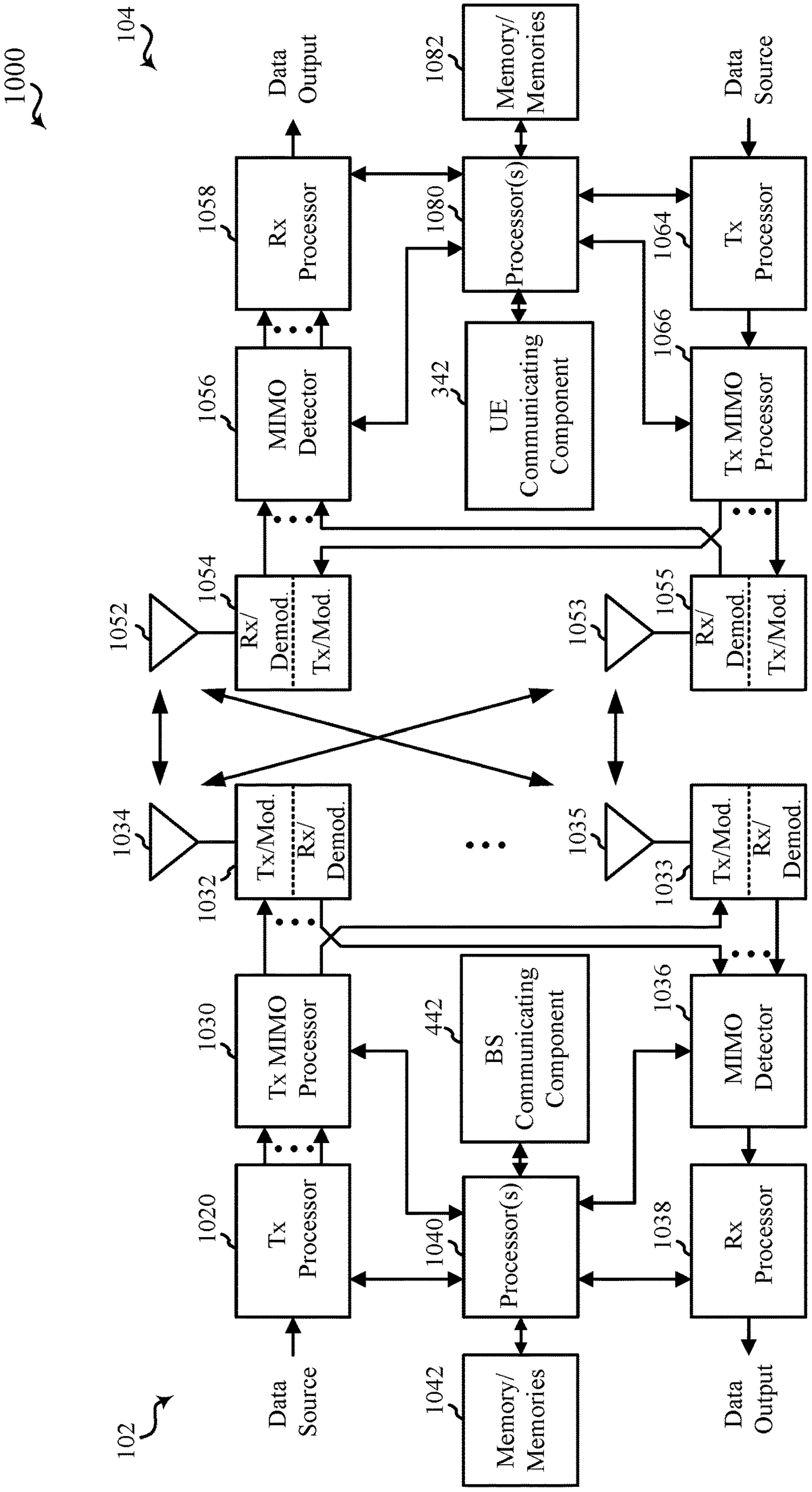
FIG. 10 is a block diagram illustrating an example of a MIMO communication system including a base station and a UE, in accordance with various aspects described herein.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1 and 3. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor(s) 1080, or memory/memories 1082.

The processor(s) 1080 may in some cases execute stored instructions to instantiate a UE communicating component 342 (see e.g., FIGS. 1 and 3).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for single carrier-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor(s) 1040 or memory/memories 1042.

The processor(s) 1040 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1000.

The following aspects are illustrative only and aspects thereof may be combined with aspects of other embodiments or teaching described herein, without limitation.

Aspect 1 is a method for wireless communication at a UE including receiving, from a network entity, an indication to modify a SSB configuration in a first subset of a set of time periods, and transmitting, for the network entity and based on the indication, UCI indicating whether the UE is to transmit uplink communications in a second subset of the set of time periods.

In Aspect 2, the method of Aspect 1 includes where the indication is received at least a threshold period of time before the UCI is transmitted, where the indication indicates removing a SSB in the first subset of the set of time periods, and where the second subset of the set of time periods does not include the first subset of the set of time periods.

In Aspect 3, the method of any of Aspects 1 or 2 includes where the indication is received at least a threshold period of time before the UCI is transmitted, where the indication indicates adding a SSB in the first subset of the set of time periods, and where the second subset of the set of time periods includes the first subset of the set of time periods.

In Aspect 4, the method of Aspect 3 includes where the UCI indicates the uplink communications are not transmitted in the first subset of the set of time periods.

In Aspect 5, the method of any of Aspects 1 to 4 includes where the indication is received at least a threshold period of time before the UCI is transmitted, where the indication indicates removing a SSB in the first subset of the set of time periods, and where the second subset of the set of time periods includes the first subset of set of time periods.

In Aspect 6, the method of Aspect 5 includes where the UCI indicates the uplink communications are transmitted in the first subset of the set of time periods.

In Aspect 7, the method of any of Aspects 1 to 6 includes where the indication is received at least a threshold period of time before the UCI is transmitted, where the indication indicates adding a SSB in the first subset of the set of time periods, and where the second subset of the set of time periods does not include the first subset of the set of time periods.

In Aspect 8, the method of any of Aspects 1 to 7 includes where the indication is received after a threshold period of time before the UCI is transmitted or after the UCI is transmitted, where the indication indicates adding a SSB in the first subset of the set of time periods, where the UCI indicates the uplink communications are transmitted in the first subset of the set of time periods, and refraining, based on the indication, from transmitting the uplink communications in the first subset of the set of time periods.

In Aspect 9, the method of any of Aspects 1 to 8 includes transmitting, for the network entity, the uplink communications in at least a portion of the second subset of the set of time periods according to the UCI.

Aspect 10 is a method for wireless communication at a network entity including transmitting, for a UE, an indication to modify a SSB configuration in a first subset of set of time periods, and receiving, for the UE and based on the indication, UCI indicating whether the UE is to transmit uplink communications in a second subset of the set of time periods.

In Aspect 11, the method of Aspect 10 includes where the indication is transmitted at least a threshold period of time before the UCI is received, where the indication indicates removing a SSB in the first subset of the set of time periods, and where the second subset of the set of time periods does not include the first subset of the set of time periods.

In Aspect 12, the method of any of Aspects 10 or 11 includes where the indication is transmitted at least a threshold period of time before the UCI is received, where the indication indicates adding a SSB in the first subset of the set of time periods, and where the second subset of the set of time periods includes the first subset of the set of time periods.

In Aspect 13, the method of Aspect 12 includes where the UCI indicates uplink communications are not transmitted in the first subset of the set of time periods.

In Aspect 14, the method of any of Aspects 10 to 13 includes where the indication is transmitted at least a threshold period of time before the UCI is received, where the indication indicates removing a SSB in the first subset of the set of time periods, and where the second subset of the set of time periods includes the first subset of set of time periods.

In Aspect 15, the method of Aspect 14 includes where the UCI indicates uplink communications are transmitted in the first subset of the set of time periods.

In Aspect 16, the method of any of Aspects 10 to 15 includes where the indication is transmitted at least a threshold period of time before the UCI is received, where the indication indicates adding a SSB in the first subset of the set of time periods, and where the second subset of the set of time periods does not include the first subset of the set of time periods.

In Aspect 17, the method of any of Aspects 10 to 16 includes where the indication is transmitted after a threshold period of time before the UCI is received or after the UCI is received, where the indication indicates adding a SSB in the first subset of the set of time periods, where the UCI indicates uplink communications are transmitted in the first subset of the set of time periods, and refraining, based on the indication, from receiving the uplink communications in the first subset of the set of time periods.

In Aspect 18, the method of any of Aspects 10 to 17 includes receiving, for the UE, the uplink communications in at least a portion of the second subset of the set of time periods according to the UCI.

Aspect 19 is an apparatus for wireless communication including one or more processors, one or more memories coupled with the one or more processors, and instructions stored in the one or more memories and operable, when executed by the one or more processors, to cause the apparatus to perform any of the methods of Aspects 1 to 18.

Aspect 20 is an apparatus for wireless communication including means for performing any of the methods of Aspects 1 to 18.

Aspect 21 is one or more computer-readable media including code executable by one or more processors for wireless communications, the code including code for performing any of the methods of Aspects 1 to 18.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
- a transceiver;
- one or more memories configured to, individually or in combination, store instructions; and
- one or more processors communicatively coupled with the one or more memories, wherein the one or more processors are, individually or in combination, configured to execute the instructions to cause the apparatus to:
  - receive, from a network entity, an indication to modify a synchronization signal block (SSB) configuration in a first subset of a set of time periods, wherein the indication indicates:
    - that an SSB not indicated in the SSB configuration is being transmitted in the first subset of the set of time periods; or
    - that an SSB indicated in the SSB configuration is not being transmitted in the first subset of the set of time periods; and
  - transmit, for the network entity and based on the indication, uplink control information (UCI) indicating whether the apparatus is to transmit uplink communications in a second subset of the set of time periods.

2. The apparatus of claim 1, wherein the indication is received at least a threshold period of time before the UCI is transmitted, wherein the indication indicates removing a SSB in the first subset of the set of time periods, and wherein the second subset of the set of time periods does not include the first subset of the set of time periods.

3. The apparatus of claim 1, wherein the indication is received at least a threshold period of time before the UCI is transmitted, wherein the indication indicates adding a SSB in the first subset of the set of time periods, and wherein the second subset of the set of time periods includes the first subset of the set of time periods.

4. The apparatus of claim 3, wherein the UCI indicates the uplink communications are not transmitted in the first subset of the set of time periods.

5. The apparatus of claim 1, wherein the indication is received at least a threshold period of time before the UCI is transmitted, wherein the indication indicates removing a SSB in the first subset of the set of time periods, and wherein the second subset of the set of time periods includes the first subset of the set of time periods.

6. The apparatus of claim 5, wherein the UCI indicates the uplink communications are transmitted in the first subset of the set of time periods.

7. The apparatus of claim 1, wherein the indication is received at least a threshold period of time before the UCI is transmitted, wherein the indication indicates adding a SSB in the first subset of the set of time periods, and wherein the second subset of the set of time periods does not include the first subset of the set of time periods.

8. The apparatus of claim 1, wherein the indication is received after a threshold period of time before the UCI is transmitted or after the UCI is transmitted, wherein the indication indicates adding a SSB in the first subset of the set of time periods, wherein the UCI indicates the uplink communications are transmitted in the first subset of the set of time periods, and wherein the one or more processors are, individually or in combination, configured to execute the instructions to cause the apparatus to refrain, based on the indication, from transmitting the uplink communications in the first subset of the set of time periods.

9. The apparatus of claim 1, wherein the one or more processors are, individually or in combination, configured to execute the instructions to cause the apparatus to transmit, for the network entity, the uplink communications in at least a portion of the second subset of the set of time periods according to the UCI.

10. An apparatus for wireless communication, comprising:
- a transceiver;
- one or more memories configured to, individually or in combination, store instructions; and
- one or more processors communicatively coupled with the one or more memories, wherein the one or more processors are, individually or in combination, configured to execute the instructions to cause the apparatus to:
  - transmit, for a user equipment (UE), an indication to modify a synchronization signal block (SSB) configuration in a first subset of a set of time periods, wherein the indication indicates:
    - that an SSB not indicated in the SSB configuration is being transmitted in the first subset of the set of time periods; or
    - that an SSB indicated in the SSB configuration is not being transmitted in the first subset of the set of time periods; and
  - receive, for the UE and based on the indication, uplink control information (UCI) indicating whether the UE is to transmit uplink communications in a second subset of the set of time periods.

11. The apparatus of claim 10, wherein the indication is transmitted at least a threshold period of time before the UCI is received, wherein the indication indicates removing a SSB in the first subset of the set of time periods, and wherein the second subset of the set of time periods does not include the first subset of the set of time periods.

12. The apparatus of claim 10, wherein the indication is transmitted at least a threshold period of time before the UCI is received, wherein the indication indicates adding a SSB in the first subset of the set of time periods, and wherein the second subset of the set of time periods includes the first subset of the set of time periods.

13. The apparatus of claim 12, wherein the UCI indicates uplink communications are not transmitted in the first subset of the set of time periods.

14. The apparatus of claim 10, wherein the indication is transmitted at least a threshold period of time before the UCI is received, wherein the indication indicates removing a SSB in the first subset of the set of time periods, and wherein the second subset of the set of time periods includes the first subset of the set of time periods.

15. The apparatus of claim 14, wherein the UCI indicates uplink communications are transmitted in the first subset of the set of time periods.

16. The apparatus of claim 10, wherein the indication is transmitted at least a threshold period of time before the UCI is received, wherein the indication indicates adding a SSB in the first subset of the set of time periods, and wherein the second subset of the set of time periods does not include the first subset of the set of time periods.

17. The apparatus of claim 10, wherein the indication is transmitted after a threshold period of time before the UCI is received or after the UCI is received, wherein the indication indicates adding a SSB in the first subset of the set of time periods, wherein the UCI indicates uplink communications are transmitted in the first subset of the set of time periods, and wherein the one or more processors are, individually or in combination, configured to execute the instructions to cause the apparatus to refrain, based on the indication, from receiving the uplink communications in the first subset of the set of time periods.

18. The apparatus of claim 10, wherein the one or more processors are, individually or in combination, configured to execute the instructions to cause the apparatus to receive, for the UE, the uplink communications in at least a portion of the second subset of the set of time periods according to the UCI.

19. A method for wireless communication at a user equipment (UE), comprising:

receiving, from a network entity, an indication to modify a synchronization signal block (SSB) configuration in a first subset of a set of time periods, wherein the indication indicates:

that an SSB not indicated in the SSB configuration is being transmitted in the first subset of the set of time periods; or that an SSB indicated in the SSB configuration is not being transmitted in the first subset of the set of time periods; and transmitting, for the network entity and based on the indication, uplink control information (UCI) indicating whether the UE is to transmit uplink communications in a second subset of the set of time periods.

20. The method of claim 19, wherein the indication is received at least a threshold period of time before the UCI is transmitted, wherein the indication indicates removing a SSB in the first subset of the set of time periods, and wherein the second subset of the set of time periods does not include the first subset of the set of time periods.

* * * * *